United States Patent [19]

Hesseltine

[11] Patent Number: 5,377,419
[45] Date of Patent: Jan. 3, 1995

[54] METHOD AND MEANS FOR MEASURING SQUARENESS OF TWO OPPOSING CORNERS ON PLATE STRUCTURES

[76] Inventor: Dennis R. Hesseltine, 1208 15th St., West Des Moines, Iowa 50265

[21] Appl. No.: 64,898

[22] Filed: May 24, 1993

[51] Int. Cl.$^6$ .............................................. G01B 5/24
[52] U.S. Cl. ..................................... 33/535; 33/538; 33/549; 33/805
[58] Field of Search ............... 33/535, 534, 538, 549, 33/1 AA, 783, 784, 792, 803, 555, 804, 805, 806, 810, 811, 555.3, 418, 419, 427, 452, 456, 459, 460, 461, 462, 464, 495

[56] References Cited

U.S. PATENT DOCUMENTS

| | | | |
|---|---|---|---|
| 1,488,818 | 4/1924 | Johansson et al. | 33/549 |
| 1,659,915 | 2/1928 | Hilfiker | 33/806 |
| 1,671,737 | 5/1928 | Norton | 33/501.02 |
| 2,785,476 | 3/1957 | Swanson | 33/803 |
| 3,094,788 | 6/1963 | Mahlmeister et al. | 33/549 |
| 3,503,131 | 3/1970 | Warner | 33/810 |
| 3,978,589 | 9/1976 | Courtepatte et al. | 33/803 |
| 4,208,796 | 6/1980 | Michaud et al. . | |
| 4,366,623 | 1/1983 | Bergqvist . | |
| 4,741,108 | 5/1988 | Cohen | 33/783 |
| 4,969,275 | 11/1990 | Hesseltine | 33/549 |
| 5,070,623 | 12/1991 | Barnes | 33/555.3 |
| 5,133,135 | 7/1992 | Durfee, Jr. | 33/535 |
| 5,148,612 | 9/1992 | Walser et al. | 33/810 |
| 5,216,818 | 6/1993 | Rucinski et al. | 33/803 |
| 5,291,664 | 3/1994 | Pinney, Jr. et al. | 33/485 |

Primary Examiner—Christopher W. Fulton
Attorney, Agent, or Firm—Zarley, McKee, Thomte, Voorhees, & Sease

[57] ABSTRACT

An improvement to a measuring table for fabricated plate products, such as sheet metal and the like. A measuring table having legs for support of flat table surfaces with opposite sides and ends is equipped with a straight reference gauge extending squarely across the table surfaces near one end and a slot extending at right angles to the straight reference gauge. The improvement to such a measuring table comprises a linearly stationary yet pivotal contact mounted in the slot adjacent to the reference gauge, a pivotal contact movable in the slot by a carriage slide mounted to the underside of the table, and a microprocessor operatively connected to the contacts to receive, store, process and display the measurements therebetween. The method of this invention comprises the steps of spreading the contacts to accommodate between them a plate laid on the table surface, positioning one corner of the plate against the linearly stationary yet pivotal contact, sliding and pivoting the movable contact against an opposing corner to generate a first measurement of the plate's diagonal, repeating the above steps to generate a second measurement across another diagonal, and comparing the deviation between the first and second measurements to a predetermined acceptable limit. Those plates having excessive deviations between the diagonals are rejected as out of square.

11 Claims, 2 Drawing Sheets

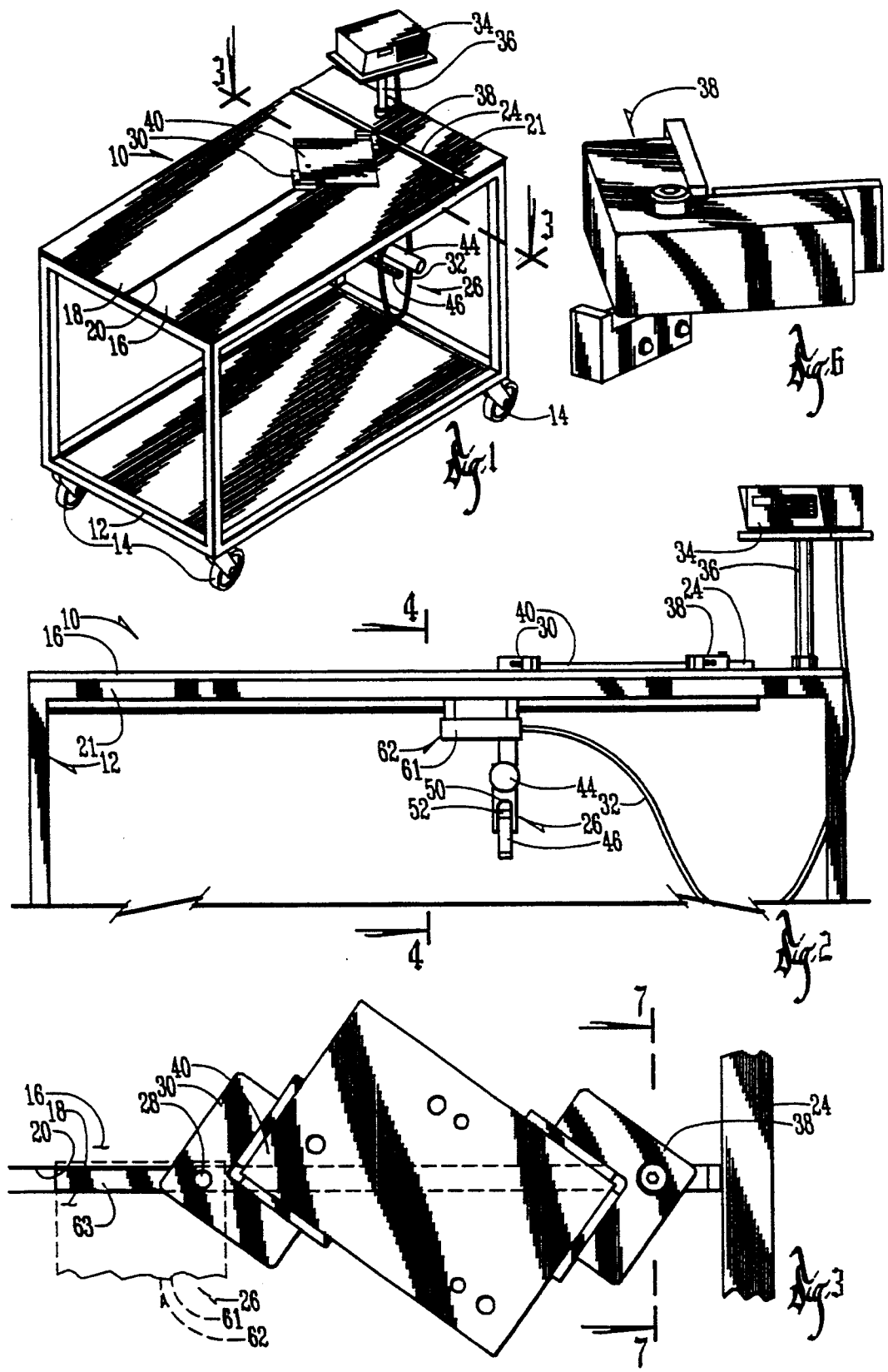

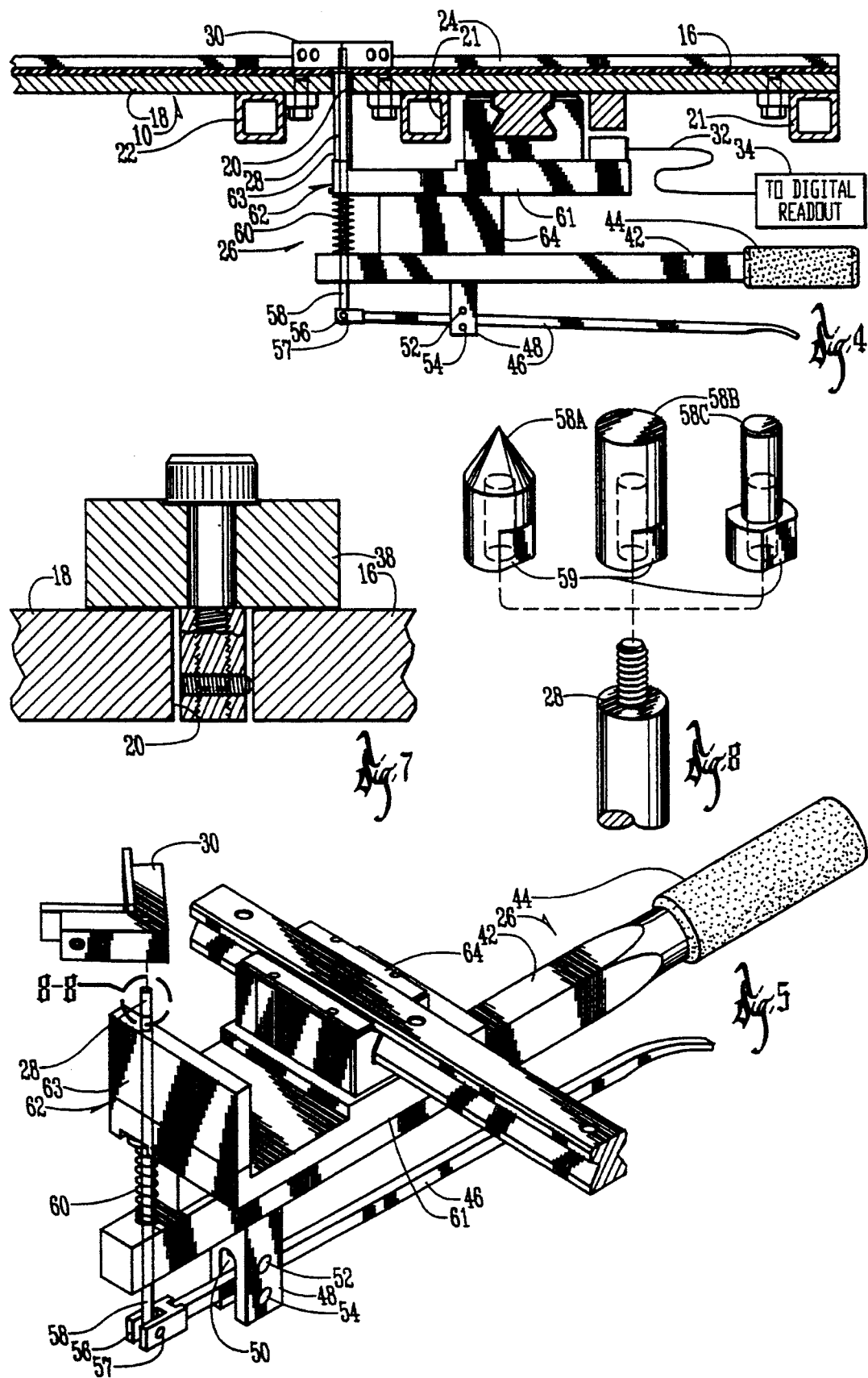

METHOD AND MEANS FOR MEASURING SQUARENESS OF TWO OPPOSING CORNERS ON PLATE STRUCTURES

BACKGROUND OF THE INVENTION

The field of this invention includes methods and equipment for measuring fabricated plate structures. Sheet metal and other structural plate products are conventionally cut to size and shape. Apertures in the plate are punched or otherwise created. Such processing proceeds according to predetermined design considerations. Quality control requires that the finished plates be remeasured to confirm the accuracy of their length, width, precise location of the apertures, and squareness.

Heretofore, it has been a practice in such quality control operations to utilize a table surface having an elongated slot extending at right angles from a straight gauge means. A movable carriage conveys a protruding pin in the slot. A suitable electronic measuring device is associated with the pin and a digital display.

A plate having a straight edge is abutted against the straight gauge means (hereafter stop) after the pin has been moved longitudinally in the slot to provide space between the pin and the stop to permit the plate to rest on the table surface. By bringing the pin to the edge of the plate opposite to the stop, and actuating the measuring device, the precise length of the plate can be confirmed.

If there are one or more apertures in the plate that need to have their locations verified, the plate must be tilted upward so the pin can be moved under the plate and inside the aperture. The plate is laid back flat on the table surface to take the desired measurement. Having to raise the plate for such measurements is time-consuming, hazardous and laborious for the user.

U.S. Pat. No. Re. 34,078 brought an improvement to the art of measuring plates with a selectively retractable pin in the slot of a measuring table. This improvement made the measuring table a more powerful, convenient tool for industrial quality control. However, some types of dimensional conformities are still difficult to verify on a conventional retractable pin measuring tables without repositioning and measuring the plate several times. For these reasons, squareness of plate edges is difficult to verify on retractable pin measuring tables.

Therefore, it is a principal object of this invention to provide a convenient and economical method and means for measuring the squareness of plate edges on a measuring table.

It is a further object of this invention to provide table attachments for measuring the squareness of plate edges.

It is a further object of this invention to provide squareness checking attachments which allow the existing pin, slot and digital readout of a conventional measuring table to be utilized.

It is a further object of this invention to provide a gauge generating a digital signal indicative of squareness capable of being processed by either the gauge itself or an existing digital readout on the table.

It is a further object of this invention to provide a measuring device which minimizes the number of measurements required on the measuring table to verify squareness.

It is a further object of this invention to provide a method of measure squareness which is quickly completable.

It is further an object of this invention to provide attachments for performing additional functions on a measuring table so that squareness can be conveniently measured.

It is further an object of this invention to provide attachments for measuring squareness on a measuring table so that the handling of plates is minimized.

It is further an object of this invention to provide attachments for measuring squareness on a measuring table whereby off-table measurements are avoided.

These and other objects will be apparent to those skilled in the art.

SUMMARY OF THE INVENTION

The apparatus of this invention comprises an improvement to a measuring table for fabricated plate products, such as sheet metal and the like. A measuring table having legs for support of flat table surfaces with opposite sides and ends is equipped with a straight reference gauge extending squarely across the table surfaces near one end and a slot extending at right angles to the gauge means. The improvement to such a measuring table comprises a linearly stationary yet pivotal contact mounted in the slot adjacent to the reference gauge means, a pivotal contact movable in the slot by a carriage means mounted to the underside of the table, and a microprocessor operatively connected to the contacts to receive, store, process and display the measurements therebetween.

The method of this invention comprises the steps of spreading the contacts to accommodate between them a plate laid on the table surface, positioning one corner of the plate against the linearly stationary yet pivotal contact, sliding the pivotal and movable contact against an opposing corner to generate a first measurement of the plate's diagonal, repeating the above steps to generate a second measurement across another diagonal, and comparing the deviation between the first and second measurements to a predetermined acceptable limit. Those plates having excessive deviations between the diagonals are rejected as out of square.

BRIEF DESCRIPTION OF THE DRAWINGS

FIG. 1 is a perspective view of a measuring table equipped with the squareness checking means of this invention.

FIG. 2 is a front elevation view of a measuring table equipped with the squareness checking means of this invention.

FIG. 3 is an enlarged top view of the squareness checking means of this invention.

FIG. 4 is a sectional view of the measuring table with the squareness checking means slidably attached and a movable bracket pivotally mounted thereon.

FIG. 5 is a perspective view of the squareness checking means showing how it is slidably mounted to the measuring table.

FIG. 6 is a perspective view of the fixed pivotal corner bracket of this invention.

FIG. 7 is a sectional view showing the mounting of the pivotal corner bracket to the fixed guide of the present invention.

FIG. 8 is a perspective view of various interchangeable tips for the retractable pin of this invention.

DESCRIPTION OF THE PREFERRED EMBODIMENT

The numeral 10 designates the measuring table to which this invention applies. In FIG. 1, table 10 has a rectangular frame 12 which is supported by wheels 14. Rectangular table surfaces 16 and 18 are mounted on frame 12 with an elongated slot 20 extending between them. FIG. 4 shows that table surface 16 is supported on frame members 21 and table surface 18 is supported on frame members 22.

Referring to FIG. 1, a straight reference gauge 24 is mounted to the tops of table surfaces 16 and 18, so as to extend across them at right angles to elongated slot 20. A carriage assembly 26 is slidably mounted to frame 12, in a position which does not substantially interfere with the measuring activity above the table. The preferred location is below table surfaces 16 and 18, as shown in FIG. 4. As shown in FIGS. 1 and 4, the carriage has a retractable pin 28 which selectively extends into and engages a movable and pivotal measuring contact bracket 30 resting on or above table surfaces 16 and 18. A cord 32 electrically connects pin 28 with a microprocessor 34 which rests on stand 36 so as to display the position of pin 28.

Referring again to FIG. 1, a carriage assembly is slidably attached to the underside of table 10. A conventional microprocessor control 34 is located on a mounting stand 36 on the top of table surface 18 and behind straight reference gauge 24. Digital microprocessor 34 is electrically connected to the stationary and movable contacts. Therefore, it is contemplated by the inventor that microprocessor 34 could easily receive, store, process and display signals from the measuring contacts.

A linearly stationary yet pivotal bracket 38 is fixed within slot 20 adjacent to straight reference gauge 24. To measure a plate 40, one of its corners is slid into abutment with the interior 90° angle of stationary bracket 38. Carriage means 26 is used to move pin 28 and movable bracket 30 into contact with a diagonally opposing corner of plate 40. Movable bracket 30 can rotate so as to conform to the latter corner. Therefore, these attachments to measuring table 10 provide an accurate measurement of the diagonal distance between opposing corners of a plate captured therebetween.

FIGS. 2 and 5 show that carriage means 26 is slidably mounted under table 10 for traversing the length thereof, thereby moving pin 28 and movable bracket 30 attached thereto. As best shown in FIG. 5, carriage means 26 has an elongated handle 42 with a hand grip 44 attached to its outer end. The end of handle 42 opposite hand grip 44 has a rectangular cross-section. A retractor lever 46 extends from below grip 44 through a pivot fulcrum block 48 mounted to the underside of handle 42 near the end opposite hand grip 44. The shorter end of retractor lever 46, which protrudes through a central arch opening 50 in pivot fulcrum block 48 between transverse guide pins 52 and 54, has a coupling 56 pinned to by pin 57 rod 58. The longer end of retractor lever 46 extends below hand grip 44 so lever 46 is reachable by the operator's fingers while his or her hand rests on grip 44. The tip of the free end of retractor lever 46 is also contoured and downwardly curved to be comfortably grasped by hand.

Rod 58 extends vertically through a clearance hole near the end of handle 42 opposite hand grip 44. In FIG. 4, a spring 60 surrounds rod 58 with its ends constrained between the top of handle 42 and the underside of carrier 62. Carrier 62 has a horizontal base 61 and a vertical leg 63 which fits slidably into elongated slot 20. Carrier 62 is elevated and its base is attached to the top side of handle 42 by a spacer block 64. Preferably, spacer block 64 is mounted over pivot fulcrum block 48 and near the center of carrier 62 to support the assembly, as shown in FIGS. 4 and 5. Rod 58 extends through the carrier vertical leg 63 and engages movable and pivotal bracket 30 as shown in FIG. 4.

In FIG. 8, the upper portion of rod 58 is shown to have a male thread which allows a variety of tips to be attached thereto. Tips 58A, 58B and 58C are among those contemplated to be useful for measuring plate structures. Tip 58A has a substantially conical end which is useful for finding the centers of holes or apertures in plates. Tip 58B has a cylindrical shape with a circular end face. The outside diameter of tip 58B is approximately equal to the diameter of rod 58 to which it attaches. Tip 58B is useful for outside measurements and large attachments. Tip 58C has a cylindrical shape, but its outside diameter is stepped. The lower portion of tip 58C has the same diameter as rod 58, but the diameter of the upper portion is substantially smaller than that of rod 58. Tip 58C is useful for either outside or inside measurements. This tip also accommodates other attachments like movable and pivotal bracket 30 as shown in FIG. 5. FIG. 8 also shows that tips 58A, B, and C all have flats which accommodate wrenches for installation and removal.

OPERATION OF THE INVENTION

To measure the squareness of plate 40, the movable and pivotal measuring contact bracket 30 must be spread apart from stationary contact bracket 38 to allow the plate to be laid therebetween on table surface 18. One corner of plate 40 is thereafter positioned against linearly stationary yet pivotal contact 38. Then the movable and pivotal measuring contact 30 is slid into engagement with an opposite corner of plate 40. Thereby, a measurement of the diagonal between the above-mentioned corners will be generated by the contacts. This first measurement may be displayed in a variety of conventional ways. In the preferred embodiment, a conventional microprocessor 34 receives, stores, processes and displays measurements from the contacts. If the measurement falls outside of predetermined acceptable limits, the plate is rejected.

If the plate is not rejected on first measurement, a second measurement is needed to verify acceptable squareness. The movable and pivotal contact 30 must be spread apart from the stationary contact 38 so plate 40 can be turned to measure a second diagonal. One corner of plate 40 is again positioned against linearly stationary yet pivotal contact 38. The movable contact 30 is slid into engagement with an opposite corner of plate 40. Thereby, a measurement of the diagonal between the corners is generated. This second measurement may be displayed in a variety of conventional ways. In the preferred embodiment, conventional microprocessor 34 receives, stores, processes and displays the measurements.

It is contemplated that the second measurement can be compared to predetermined acceptable limits or the first measurement by the microprocessor, the operator, or other suitable means. A conventional microprocessor 34 can easily store the first (diagonal) measurement and compare the second (diagonal) measurement to it, developing a deviation between the diagonal measurements. This deviation is indicative of the squareness of the measured plate. If this deviation exceeds the predetermined limits programmed into the microprocessor, the plate is rejected.

I claim:

1. A device for measuring the squareness of fabricated plate structures on a measuring table having legs, a supported flat table surface with opposite sides and ends, a straight reference gauge means affixed to said table near one of said ends and extending across the top of said table surface, and an elongated straight slot through said table surface extending in a direction at right angles to said gauge means, said device comprising:

- a linearly stationary yet pivotal contact bracket, mounted to said table in said slot and adjacent to said straight reference gauge means, for receiving the plate structure to be measured;
- a carriage means mounted to the underside of said table for movement along said slot;
- a movable contact for measuring the plate structures, pivotally connected to said carriage means and spaced apart from said linearly stationary yet pivotal bracket by movement of said carriage means so as to provide a measurement of the plate; and
- a microprocessor operatively connected to said linearly stationary and movable contacts for electronically processing, storing and displaying said measurements.

2. The measuring device of claim 1 wherein at least one of said contacts comprises a bracket having legs extending perpendicular to each other and providing a square inside corner therebetween against which a corner of the plate to be measured abuts.

3. The measuring device of claim 1 wherein said means for pivotally connecting said movable contact to said carriage means is an upstanding pin operatively attached to said carriage means and engaging said movable contact such that said movable contact can pivot about said pin.

4. The measuring device of claim 3 wherein said movable contact has a hole therein for matingly receiving said pin and said pin is selectively retractable from said hole.

5. The measuring device of claim 4 wherein said selectively retractable pin is urged upward by a spring.

6. The measuring device of claim 3 wherein said pin further comprises a shank having an outer diameter and opposite ends, one end being topped by detachable tip.

7. The measuring device of claim 6 wherein said detachable tip is conical in shape attached with a base to said topped end of said shank.

8. The measuring device of claim 6 wherein said detachable tip is cylindrical, having one of its ends attached to said topped end of said shank.

9. The measuring device of claim 6 wherein said interchangeable tip is cylindrical having at least two outer diameters, one of which is substantially smaller than the outer diameter of said shank.

10. The measuring device of claim 6 wherein said detachable tip has flats on opposing sides of its outer surface for turning by wrench.

11. The method of verifying the squareness of fabricated plate outer edges, comprising:

spreading apart in a slot a movable and pivotal measuring contact and a linearly stationary yet pivotal contact on a measuring table having a straight reference gauge means extending thereacross perpendicular to said slot, said contacts being sufficiently spread apart to accept the plate;

positioning one end of the plate against said linearly stationary contact;

sliding and pivoting said movable measuring contact to engage the opposing end of the plate, thereby generating a first diagonal measurement indicative of the spread across said plate and between said contacts;

repeating the above steps as needed to generate at least one more diagonal measurement; and comparing the deviation among said measurements to a predetermined acceptable limit, whereby those plates having excessive deviation are rejected as out of square.

* * * * *